United States Patent
Sakhnini et al.

(10) Patent No.: US 12,232,166 B2
(45) Date of Patent: Feb. 18, 2025

(54) NARROWBAND RANDOM ACCESS CHANNEL OCCASIONS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 17/317,582

(22) Filed: May 11, 2021

(65) Prior Publication Data

US 2022/0369365 A1   Nov. 17, 2022

(51) Int. Cl.
*H04W 74/00* (2009.01)
*H04W 8/24* (2009.01)
*H04W 72/02* (2009.01)
*H04W 72/0453* (2023.01)
*H04W 74/0833* (2024.01)

(52) U.S. Cl.
CPC .......... *H04W 74/002* (2013.01); *H04W 8/24* (2013.01); *H04W 72/02* (2013.01); *H04W 72/0453* (2013.01); *H04W 74/0841* (2013.01)

(58) Field of Classification Search
CPC . H04W 74/008; H04W 74/0841; H04W 8/24; H04W 72/02; H04W 72/0453; H04W 72/40; H04W 74/0833; H04W 74/002
See application file for complete search history.

(56) References Cited

U.S. PATENT DOCUMENTS

| | | | |
|---|---|---|---|
| 2009/0170426 A1* | 7/2009 | Jung | H04W 8/24 455/7 |
| 2013/0083749 A1* | 4/2013 | Xu | H04W 74/006 370/328 |
| 2015/0016428 A1* | 1/2015 | Narasimha | H04W 24/02 370/336 |
| 2016/0294516 A1 | 10/2016 | Zirwas | |
| 2019/0028245 A1* | 1/2019 | Gao | H04W 48/10 |
| 2019/0124646 A1* | 4/2019 | Ly | H04L 5/0007 |
| 2019/0380151 A1* | 12/2019 | Kim | H04L 27/261 |
| 2020/0107326 A1 | 4/2020 | Liu et al. | |
| 2020/0314856 A1* | 10/2020 | Bang | H04L 5/0094 |

(Continued)

OTHER PUBLICATIONS

Huawei et al., "RAN1 Aspects of RedCap UE Type and Identification", 3GPP TSG RAN WG1 Meeting #104e, R1-2100231, vol. RAN WG1, No. E-meeting, Jan. 25, 2021-Feb. 5, 2021 Jan. 19, 2021, XP051970863, 6 Pages, Subclause 2.1 Device Type Subclause 2.2 Device Identification.

(Continued)

*Primary Examiner* — Stephen J Clawson
(74) *Attorney, Agent, or Firm* — Patterson + Sheridan, L.L.P.

(57) ABSTRACT

Certain aspects of the present disclosure provide techniques for narrowband random access channel (RACH) occasions. A method that may be performed by a user equipment (UE) includes receiving, from a network entity, a configuration indicating one or more frequency resources for a RACH procedure, wherein the one or more frequency resources are arranged within a set of frequency resources allocated for RACH transmissions. The method further includes performing the RACH procedure based at least in part on the configuration.

24 Claims, 13 Drawing Sheets

702

Receive, from a network entity, a configuration indicating one or more frequency resources for a random access channel (RACH) procedure, wherein the one or more frequency resources are arranged within a set of frequency resources allocated for RACH transmissions

704

Perform the RACH procedure based at least in part on the configuration

(56) References Cited

U.S. PATENT DOCUMENTS

| | | | | |
|---|---|---|---|---|
| 2021/0367707 A1* | 11/2021 | Wu | ................ | H04J 13/0029 |
| 2022/0046572 A1* | 2/2022 | Sengupta | ............ | H04B 7/1851 |
| 2022/0124766 A1* | 4/2022 | Jung | ............... | H04W 72/1273 |
| 2023/0363016 A1* | 11/2023 | Lin | ................ | H04W 74/004 |

OTHER PUBLICATIONS

International Search Report and Written Opinion—PCT/US2022/072071—ISA/EPO—Aug. 30, 2022.
NTT Docomo et al., "Discussion on Reduced Maximum UE Bandwidth for RedCap", 3GPP TSG RAN WG1 #104bis-e, R1-2103583, vol. RAN WG1, No. e-Meeting, Apr. 12, 2021-Apr. 20, 2021 Apr. 7, 2021, XP052178285, 8 Pages, Subclause 2.1 RACH Ocassions Outside the UE BW.
Wilus Inc: "Discussion on Reduced Maximum UE Bandwidth for RedCap UE", 3GPP TSG RAN WG1 #104b-e R1-2103698, vol. RAN WG1, No. e-Meeting, Apr. 12, 2021-Apr. 20, 2021 Apr. 7, 2021, XP052178351, 6 Pages, Subclause 2 Discussion on Reduced Bandwidth for RedCap UEs.

* cited by examiner

NARROWBAND RANDOM ACCESS CHANNEL OCCASIONS

BACKGROUND

Field of the Disclosure

Aspects of the present disclosure relate to wireless communications, and more particularly, to techniques for random access channel (RACH) communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide random access for narrowband devices.

Certain aspects of the subject matter described in this disclosure can be implemented in a method for wireless communication by a user equipment (UE). The method generally includes receiving, from a network entity, a configuration indicating one or more frequency resources for a random access channel (RACH) procedure, wherein the one or more frequency resources are arranged within a set of frequency resources allocated for RACH transmissions. The method further includes performing the RACH procedure based at least in part on the configuration.

Certain aspects of the subject matter described in this disclosure can be implemented in a method for wireless communication by a network entity. The method generally includes transmitting, to a UE, a configuration indicating one or more frequency resources for a RACH procedure, wherein the one or more frequency resources are arranged within a set of frequency resources allocated for RACH transmissions. The method also includes performing the RACH procedure based at least in part on the configuration.

Certain aspects of the subject matter described in this disclosure can be implemented in an apparatus for wireless communication. The apparatus generally includes a transceiver configured to receive, from a network entity, a configuration indicating one or more frequency resources for a RACH procedure, wherein the one or more frequency resources are arranged within a set of frequency resources allocated for RACH transmissions; and perform the RACH procedure based at least in part on the configuration.

Certain aspects of the subject matter described in this disclosure can be implemented in an apparatus for wireless communication. The apparatus generally includes a transceiver configured to transmit, to a UE, a configuration indicating one or more frequency resources for a RACH procedure, wherein the one or more frequency resources are arranged within a set of frequency resources allocated for RACH transmissions; and perform the RACH procedure based at least in part on the configuration.

Certain aspects of the subject matter described in this disclosure can be implemented in an apparatus for wireless communication. The apparatus generally includes means for receiving, from a network entity, a configuration indicating one or more frequency resources for a RACH procedure, wherein the one or more frequency resources are arranged within a set of frequency resources allocated for RACH transmissions; and means for performing the RACH procedure based at least in part on the configuration.

Certain aspects of the subject matter described in this disclosure can be implemented in an apparatus for wireless communication. The apparatus generally includes means for transmitting, to a UE, a configuration indicating one or more frequency resources for a RACH procedure, wherein the one or more frequency resources are arranged within a set of frequency resources allocated for RACH transmissions; and means for performing the RACH procedure based at least in part on the configuration.

Certain aspects of the subject matter described in this disclosure can be implemented in a user equipment for wireless communication. The user equipment generally includes a memory and processor coupled to the memory. The processor and the memory are configured to receive, from a network entity, a configuration indicating one or more frequency resources for a RACH procedure, wherein the one or more frequency resources are arranged within a set of frequency resources allocated for RACH transmissions; and perform the RACH procedure based at least in part on the configuration.

Certain aspects of the subject matter described in this disclosure can be implemented in a network entity for wireless communication. The network entity generally includes a memory and a processor coupled to the memory. The processor and the memory are configured to transmit, to a UE, a configuration indicating one or more frequency resources for a RACH procedure, wherein the one or more frequency resources are arranged within a set of frequency resources allocated for RACH transmissions; and perform the RACH procedure based at least in part on the configuration.

Certain aspects of the subject matter described in this disclosure can be implemented in a computer-readable medium. The computer-readable medium has instructions stored thereon for receiving, from a network entity, a configuration indicating one or more frequency resources for a RACH procedure, wherein the one or more frequency resources are arranged within a set of frequency resources allocated for RACH transmissions; and performing the RACH procedure based at least in part on the configuration.

Certain aspects of the subject matter described in this disclosure can be implemented in a computer-readable medium. The computer-readable medium has instructions stored thereon for transmitting, to a UE, a configuration indicating one or more frequency resources for a RACH procedure, wherein the one or more frequency resources are arranged within a set of frequency resources allocated for RACH transmissions; and performing the RACH procedure based at least in part on the configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
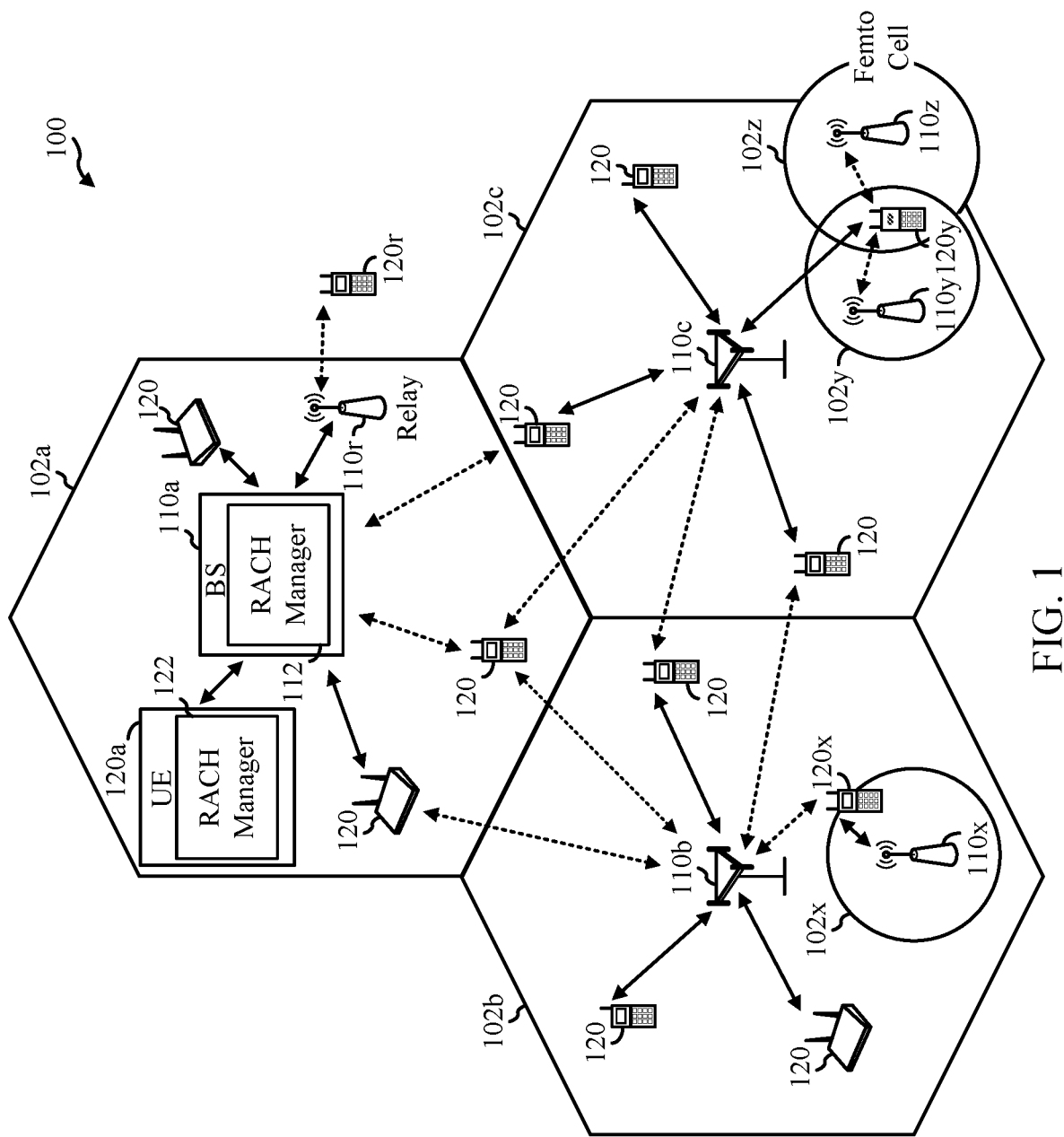
FIG. 1 is a block diagram conceptually illustrating an example wireless communication network, in accordance with certain aspects of the present disclosure.
Figure 1:
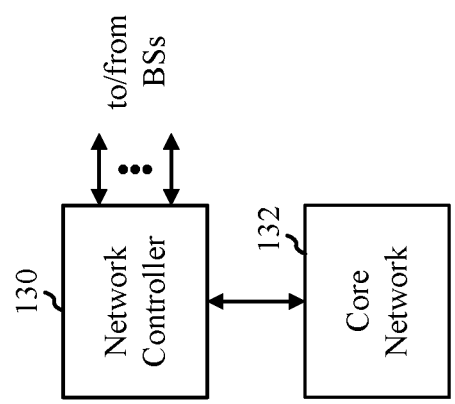

Aspects of the present disclosure provide apparatus, methods, processing systems, and computer readable mediums for configuring random access channel (RACH) transmission occasions that support narrowband communications in a RACH procedure. The network may configure a narrowband user equipment (UE) with a frequency resources for a RACH procedure, where the frequency resources may be within other frequency resources allocated for RACH communications for baseline UEs (e.g., UEs that support enhanced mobile broadband (eMBB) and/or ultra-reliable low-latency communications (URLLC)). For example, the network may configure a subset of ROs for narrowband communications within frequency division multiplexed RACH occasions (ROs) allocated for baseline UEs. The RACH configuration described herein may enable RACH communications that support narrowband capabilities, such as a reduced capability UE. In certain cases, the RACH configuration described herein may enable the UE to perform RACH communications without retuning to other frequency resources, which may provide desirable latencies for RACH communications. In certain cases, the RACH configuration described herein may enable the UE to retune to frequencies within the bandwidth capabilities of the UE, which may provide desirable reliability for RACH communications. In certain cases, the RACH configuration described herein may enable the UE to retune to the configured ROs, which may provide desirable spectral efficiency.

The following description provides examples of RACH procedures in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

As shown in FIG. 1, the BS 110a includes a RACH manager 112 that transmits a RACH configuration indicating narrowband frequency resources and communicates with a narrowband UE based on the RACH configuration, in accordance with aspects of the present disclosure. As a narrowband device, the UE 120a includes a RACH manager 122 that receives a RACH configuration indicating narrowband frequency resources and communicates with a BS based on the RACH configuration, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
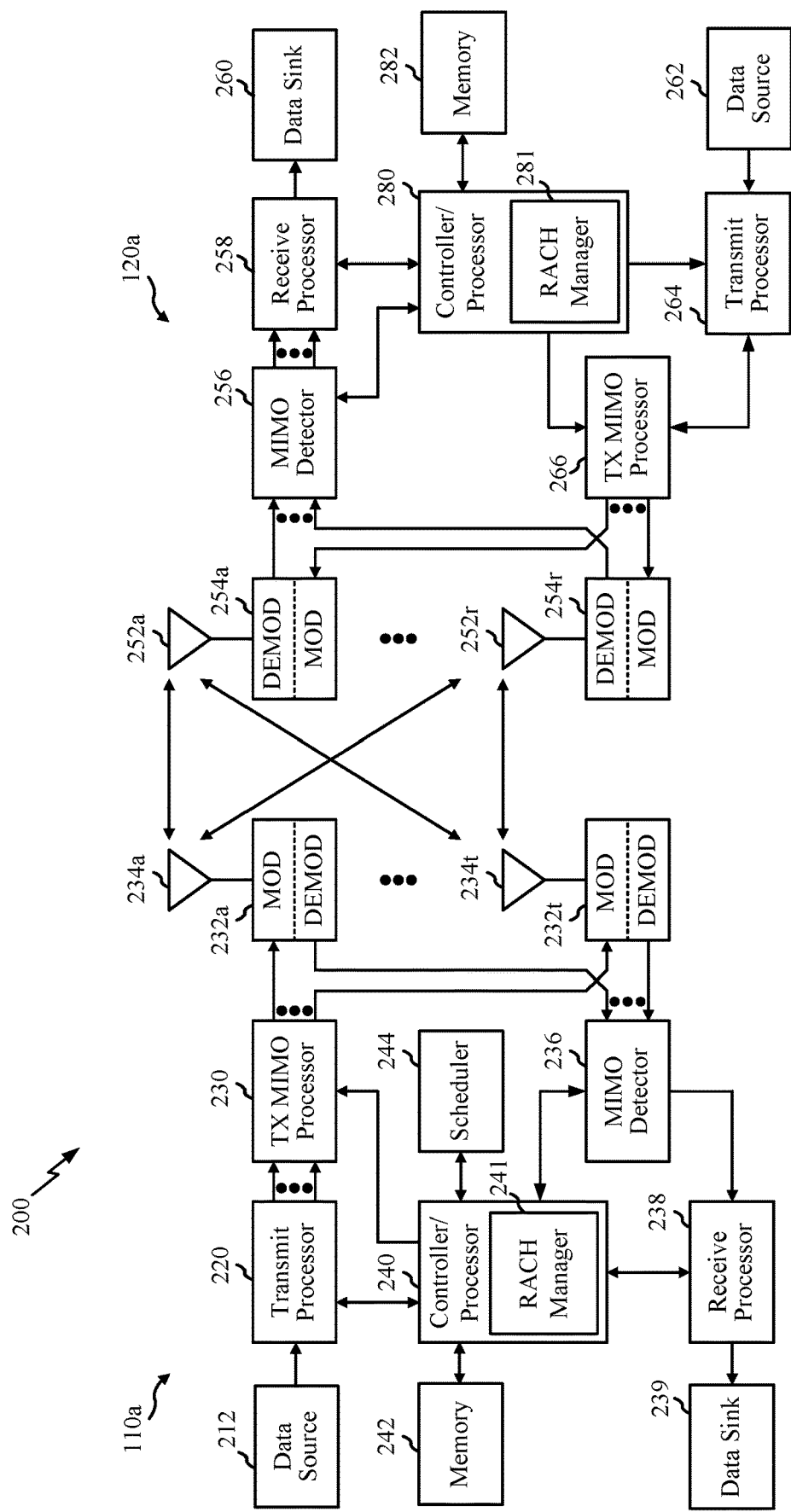
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a RACH manager 241 that may be representative of the RACH manager 112, according to aspects described herein. As shown in FIG. 2, the controller/processor 280 of the UE 120a has a RACH manager 281 that may be representative of the RACH manager 122, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
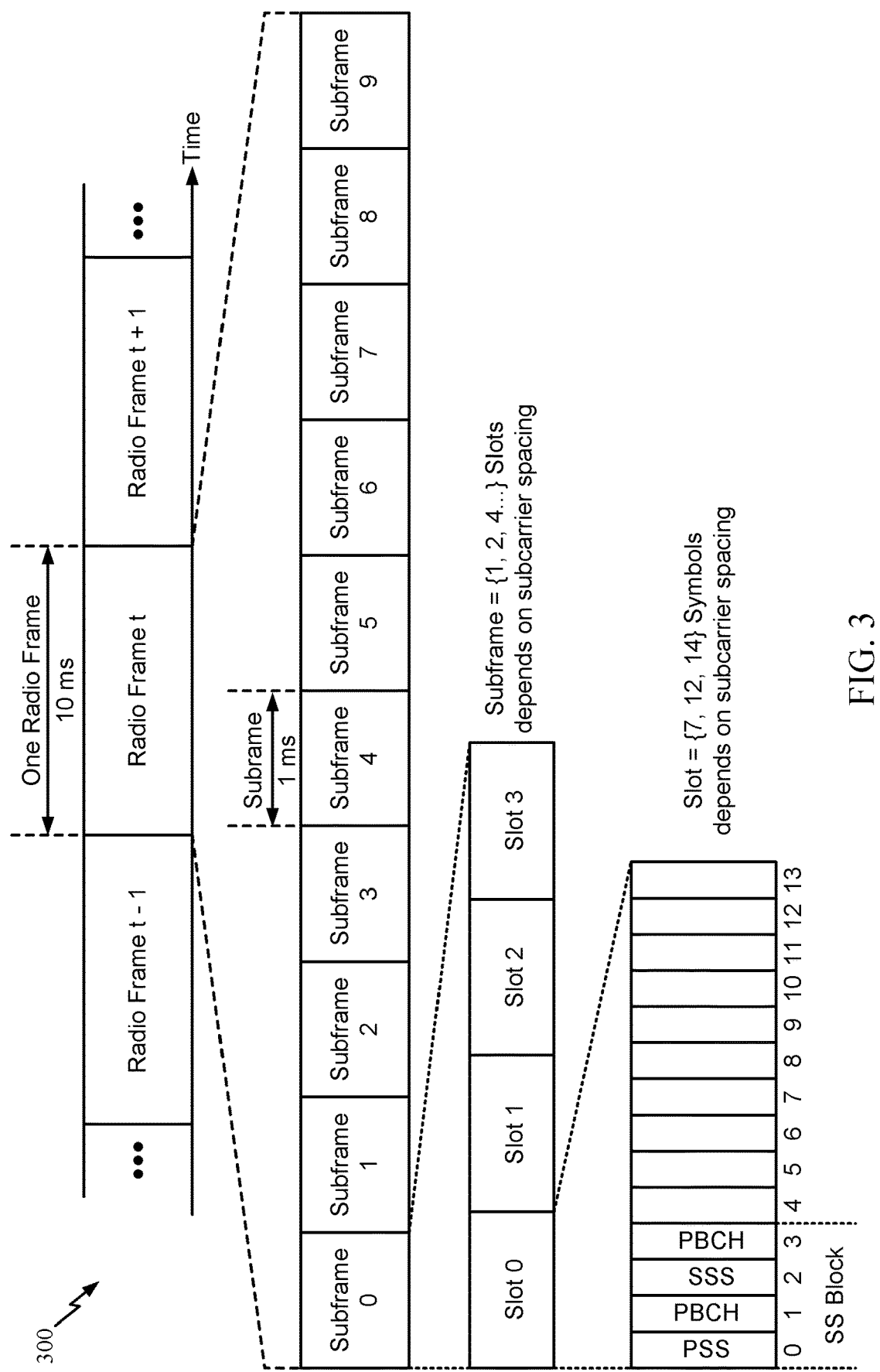
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times within an SS burst, for example, with up to sixty-four different beam directions for mmWave. The multiple transmissions of the SSB are referred to as an SS burst in a half radio frame. SSBs in an SS burst may be transmitted in the same frequency region, while SSBs in different SS bursts can be transmitted at different frequency regions.

Figure 4:
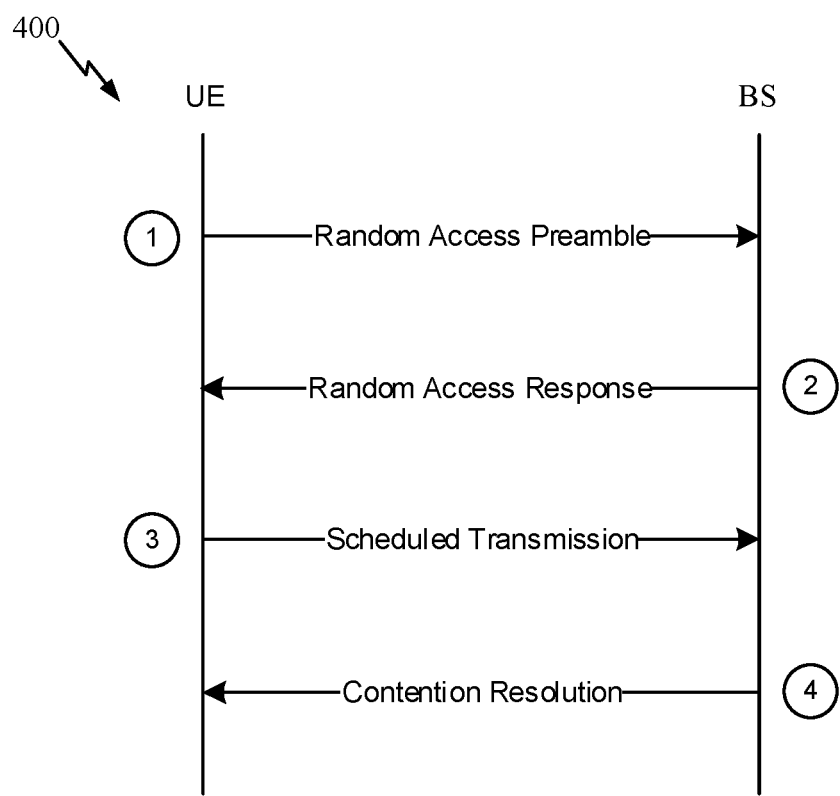
FIG. 4 is a signaling flow diagram illustrating an example four-step random access channel (RACH) procedure, in accordance with certain aspects of the present disclosure.

In various scenarios, a UE may communicate with a network entity (such as a base station) via a random access channel (RACH) procedure. For example, the UE may use a RACH procedure for initial radio resource control (RRC) connection setup, RRC connection re-establishment, a handover scenario, a scheduling request failure, beam recovery, downlink or uplink data arrival, etc. FIG. 4 illustrates an example four-step RACH procedure 400, in accordance with certain aspects of the present disclosure. In a first message (MSG1), the UE transmits a random access (RA) preamble to the BS. The UE may monitor for a response from the BS within a configured time window. The UE may receive the random access response (RAR) from the BS, where the RAR may include uplink scheduling for the UE. Upon reception of the RAR, the UE sends a third message (MSG3) using the uplink grant scheduled in the response and monitors for contention resolution. If contention resolution is not successful after the MSG3 transmission and/or retransmission(s) of MSG3, the UE may go back to MSG1 transmission.

Figure 5A:
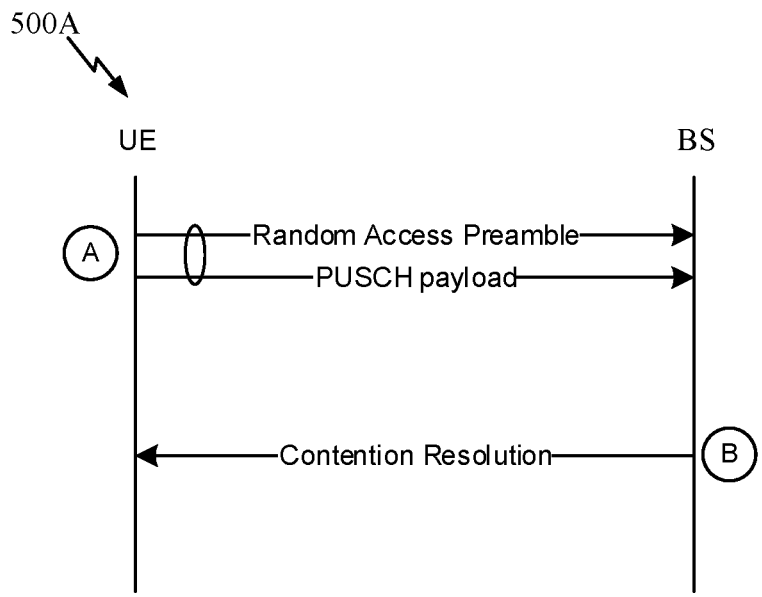
FIG. 5A is a signaling flow diagram illustrating an example of a two-step RACH procedure, where contention resolution is successful at the BS, in accordance with certain aspects of the present disclosure.

FIG. 5A illustrates an example of a two-step RACH procedure 500A, where contention resolution is successful at the BS, in accordance with certain aspects of the present disclosure. The UE may transmit in a first message (MSGA) including a preamble on a physical random access channel (PRACH) and a payload on a PUSCH. After the MSGA transmission, the UE monitors for a response from the BS within a configured time window. If contention resolution is successful upon receiving the network response (MSGB), the UE ends the random access procedure, and in certain cases, the UE may communicate with the BS in a connected state.

Figure 5B:
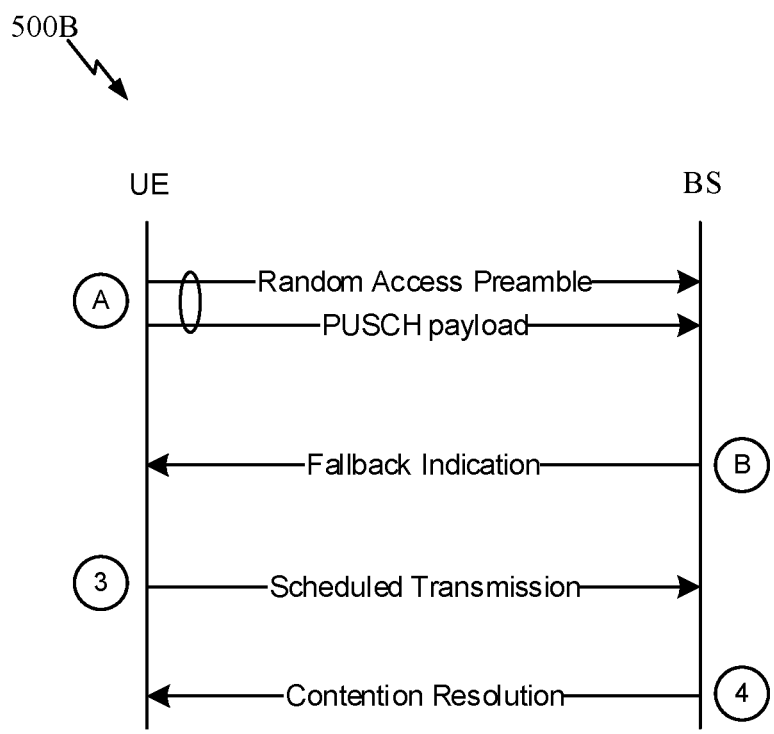
FIG. 5B is a signaling flow diagram illustrating an example of a two-step RACH procedure, where contention resolution is unsuccessful at the BS, in accordance with certain aspects of the present disclosure.

FIG. 5B illustrates an example of a two-step RACH procedure 500B, where contention resolution is unsuccessful at the BS, in accordance with certain aspects of the present disclosure. In this example, if a fallback indication is received in MSGB, the UE may perform MSG3 transmission using the UL grant scheduled in the fallback indication and monitors contention resolution. If contention resolution is not successful after MSG3 transmission and/or retransmission(s), the UE may go back to the MSGA transmission. FIGS. 4, 5A and 5B illustrate examples of contention-based random access (CBRA) procedures to facilitate understanding. Aspects of the present disclosure may also apply to contention-free random access (CFRA) procedures, where the network may initially provide a RA preamble and/or uplink resource assignment to the UE.

The UE and BS may communicate with each other via the PRACH in frequency domain and time domain resources, which may be referred to as RACH occasions (ROs). That is, an RO may include a set of frequency domain resources (e.g., physical resource blocks) and/or time domain resources (e.g., one or more symbols). Multiple ROs may be configured in a RACH slot, which may repeat every RACH configuration period. An SSB may be associated with a specific RO, such that the network may use the SSB to RO association to identify which beam the UE has acquired and is using for the RACH procedure. An SSB may be associated with one or more RACH occasions, and multiple SSBs may be associated with a RACH occasion. The association between the RO and an SSB(s) may be in the frequency domain, in the time domain within a RACH slot, and/or across RACH slots. The association between the SSB and ROs may be signaled to the UE in system information, such as SIB 1. The UE may acquire an SSB in the SSB burst and communicate with the network in PRACH procedure using the RO(s) associated with the acquired SSB. For example, the UE may send a preamble on the PRACH randomly on any of the associated ROs with equal probability.

Figure 6:
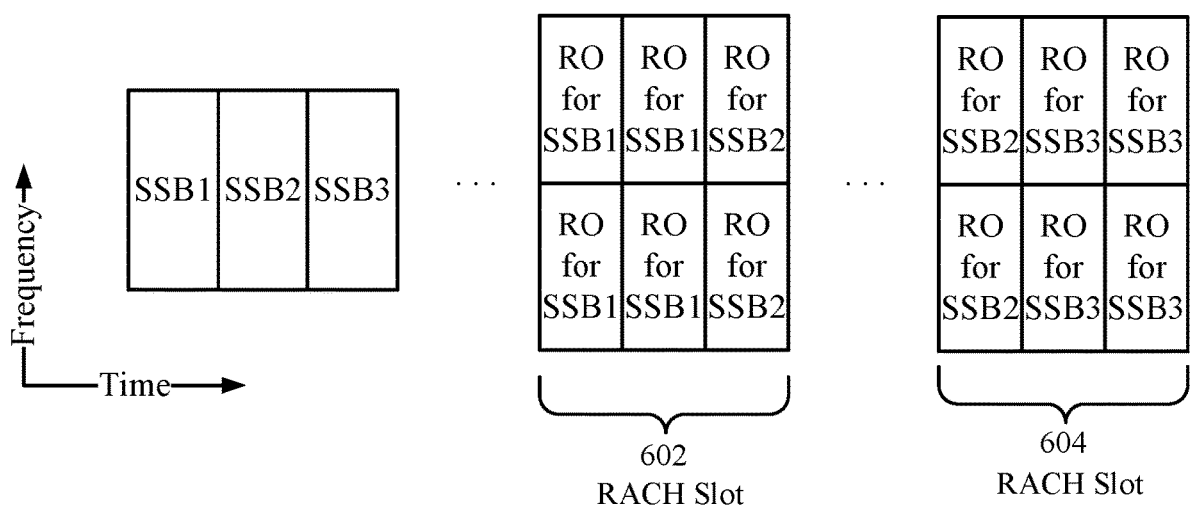
FIG. 6 is a diagram illustrating an example association between synchronization signals and RACH transmission occasions, in accordance with certain aspects of the present disclosure.

FIG. 6 is a diagram illustrating an example association between SSBs and RACH transmission occasions, in accordance with certain aspects of the present disclosure. As shown, multiple SSBs (SSB1, SSB2, and SSB3) are transmitted in specific frequency and time domain locations. In this example, a RACH slot 602 may have six ROs with four ROs associated with SSB1 and two ROs associated with SSB2. Another RACH slot 604 may also have six ROs with two ROs associated with SSB2 and four ROs associated with SSB3. In the RACH slots 602 and 604, two ROs may be Frequency-Division Multiplexed (FDM) together in each of the time instances. That is, two or more ROs may be transmitted concurrently in the same transmission occasions. Those of skill in the art will understand that the Certain wireless communication systems (e.g., Evolved Universal Terrestrial Radio Access (E-UTRA) system and/or NR system) may enable access to network services using a physical layer configured for very low power consumption and low complexity, which may be beneficial for Internet-of-Things (IoT) devices operating on battery power. These low power network services may be referred to as narrowband IoT (NB-IoT) operations. Under NB-IoT operations, a UE may support data rates up to 68 kbps for downlink and up to 132 kbps for uplink, for example, via a full carrier bandwidth of 180-200 kHz and a subcarrier spacing of 3.75 kHz or 15 kHz. At such a low bandwidth, the NB-IoT may support a low complexity transceiver to enable a low cost solution for IoT devices. In certain cases, a UE may be equipped with only a single antenna to facilitate low power consumption. The low power consumption may enable an NB-IoT device to operate for at least 10 years on battery power. Those of skill in the art will understand that the parameters for configuring NB-IoT operations are exemplary only. Additional parameters or categories of parameters may be used in addition to or instead of those described.

NR systems may support an intermediary narrowband device, which may be referred to as a reduced capability (RedCap) device. The RedCap device may support a bandwidth greater than NB-IoT devices but less than the full bandwidth capacity supported for NR communications. For example, the RedCap device may support a bandwidth of 20 MHz in FR1 and 100 MHz in FR2, whereas a baseline NR device supports a bandwidth of 100 MHz in FR1 and 200 MHz in FR2. As used herein, a narrowband device may include a RedCap device and/or a NB-IoT device. In certain cases, a narrowband device may only refer to a RedCap device.

The RedCap device may have other capability restrictions, such as fewer receiver branches, fewer downlink MIMO layers, and/or fewer downlink modulation orders compared to a baseline NR device. In certain cases, the RedCap device may also only support half-duplex communications. The RedCap device may enable a device with a lower cost and reduced complexity as compared to high-end eMBB and URLLC devices. The RedCap device may be used for wearables, industrial wireless sensors, and/or video surveillance equipment.

In an industrial wireless sensor use case, the communication service availability may be highly reliable providing an availability of 99.99%, and end-to-end latency may be less than 100 ms. The reference bit rate may be less than 2 Mbps (potentially asymmetric e.g. UL heavy traffic), and the device may be expected to be stationary. The battery may be expected to last at least a few years. For safety related sensors, latency may be lower, 5-10 ms. In the video surveillance use case, the video bitrate may be 2-4 Mbps having a latency less than 500 ms and high reliability of 99%-99.9%. High-end video (e.g. for farming) may require 7.5-25 Mbps. The traffic pattern may be dominated by UL transmissions. In the wearable use case, the bitrate for smart wearable application can be 5-50 Mbps in DL and 2-5 Mbps in UL, and peak bit rate of the device may be higher, for example, up to 150 Mbps for downlink and up to 50 Mbps for uplink. The battery of the device may be expected to last multiple days.

NR systems support up to 8 ROs to be frequency division multiplexed (FDM'ed) in the same transmission occasion. In certain cases, the total bandwidth of the FDM ROs may exceed the bandwidth capabilities of a RedCap device or other narrowband devices (such as NB-IoT). For example, at a 120 kHz SCS bandwidth of a single RO may be 17.28 MHz, such that the total bandwidth for 8 ROs at a 120 kHz SCS would be 138.24 MHz, which is greater than the supported bandwidth of a RedCap device at 100 MHz for FR2. If the network configures 8 ROs to be frequency division multiplexed, some ROs will be outside the bandwidth capability for a RedCap device.

To enable ROs to be within the bandwidth capabilities of a narrowband device, various approaches may be taken. For example, the UE may retune to other frequency resources for a RACH procedure. The NR system may support a separate initial uplink bandwidth part for narrowband devices. The network may impose restrictions on existing PRACH configurations and/or FDM'ed ROs. That is, the network may only allow a PRACH configuration and/or FDM'ed ROs to support the bandwidth capabilities of narrowband devices. The network may restrict the initial uplink bandwidth part to be within the bandwidth capability of a narrowband device. The network may provide a dedicated PRACH configuration for narrowband devices. Accordingly, what is needed are techniques and apparatus for configuring ROs that support narrowband communications.

Example Narrowband Random Access Channel Occasions

Aspects of the present disclosure provide techniques and apparatus for configuring ROs that support narrowband communications in a RACH procedure. The network may configure the narrowband UE (such as a RedCap UE) with a frequency resources for a RACH procedure, where the frequency resources may be within other frequency resources allocated for RACH communications for baseline UEs (e.g., UEs that support eMBB and/or URLLC). For example, the network may configure a subset of ROs for narrowband communications within FDM'ed ROs allocated for baseline UEs. The RACH configuration described herein may enable RACH communications that support narrowband capabilities, such as a RedCap UE. In certain cases, the RACH configuration described herein may enable the UE to perform RACH communications without retuning to other frequency resources, which may provide desirable latencies for RACH communications. In certain cases, the RACH configuration described herein may enable the UE to retune to frequencies within the bandwidth capabilities of the UE, which may provide desirable reliability for RACH communications. In certain cases, the RACH configuration described herein may enable the UE to retune to the configured ROs, which may provide desirable spectral efficiency.

Figure 7:
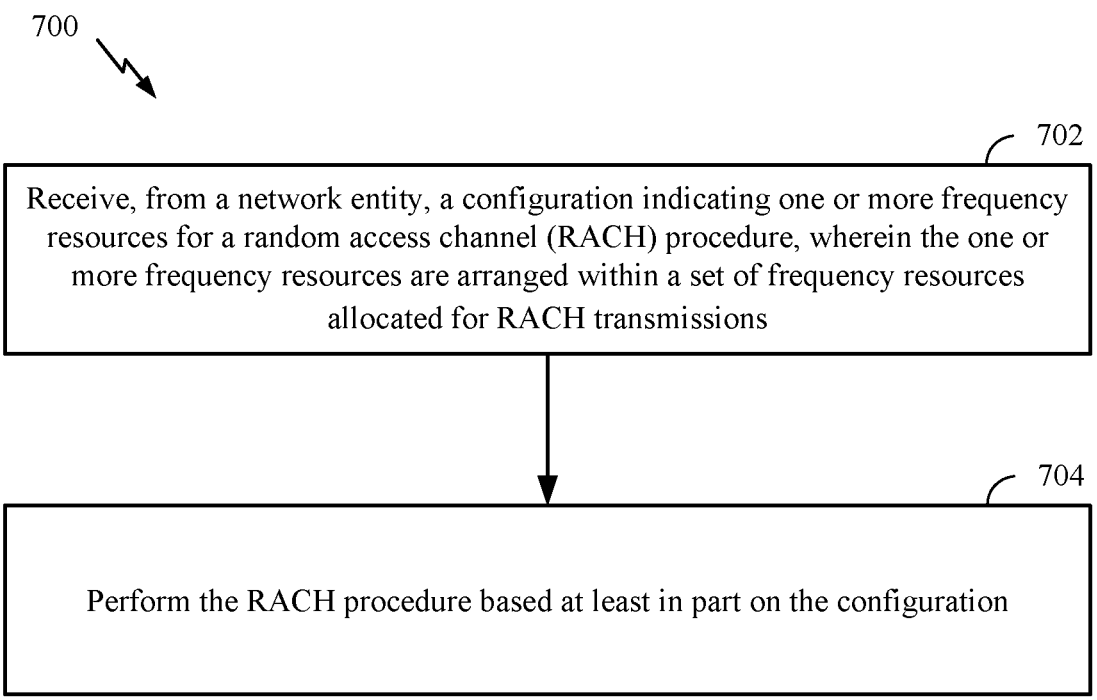
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (such as the UE 120*a* in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2) and/or a transceiver (e.g., the transceiver 254). In certain aspects, the transmission and/or reception of signals by the UE may be implemented via a bus interface of one or more processors (e.g., controller/processor 280) obtaining and/or outputting signals.

Figure 9:
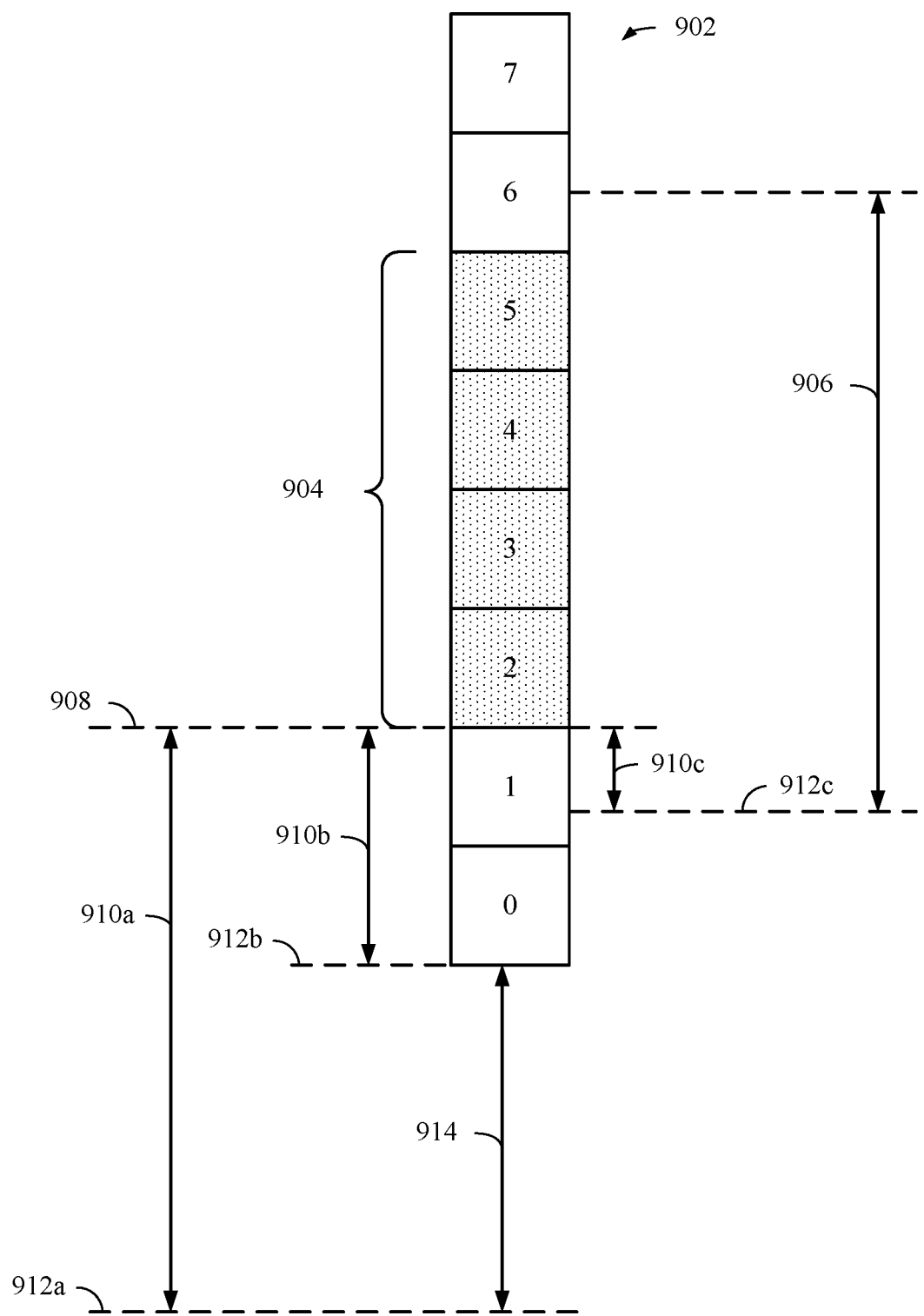
FIG. 9 is a diagram illustrating an example arrangement of RACH frequency resources for a narrowband device, in accordance with certain aspects of the present disclosure.

The operations 700 may begin, at block 702, where the UE may receive, from a network entity (e.g., the BS 110), a configuration indicating one or more frequency resources for a RACH procedure, where the frequency resources are arranged within a set of frequency resources allocated for RACH transmissions, for example, as further described herein with respect to FIG. 9. In aspects, the frequency resources may have a bandwidth in compliance with a narrowband capability of the UE, such as a RedCap UE. The narrowband capability may support a bandwidth of 20 MHz for a first frequency range (e.g., FR1) and a bandwidth of 100 MHz for a second frequency range (e.g., FR2). In certain cases, the frequency resources may be arranged in the set of frequency resources allocated for RACH transmissions associated with baseline NR devices, such as UEs that support eMBB and/or URLCC services. That is, the frequency resources may be narrowband resources within the frequency resources available to baseline NR devices.

At block 704, the UE may perform a RACH procedure (e.g., any of the RACH procedures described herein with respect to FIG. 4, 5A, or 5B) based at least in part on the configuration. For example, the UE may transmit a preamble to the network entity with the frequency resources indicated in the configuration, and the UE may receive a random access response from the network entity with the frequency resources indicated in the configuration.

In certain aspects, the configuration may include a starting point for the frequency resources and a number (quantity) of the frequency resources. That is, the configuration may include the size of the ROs allocated for narrowband communications and the location of the ROs in the frequency domain based on the starting point and size. The starting point may be in terms of an offset from a frequency reference point, such as the lowest frequency resource in a bandwidth part or the lowest RO allocated for baseline NR communications. The number of frequency resources may be in terms of resource blocks and/or ROs.

For example, the starting point may be indicated in terms of a frequency offset from a lowest frequency resource in the set of frequency resources. The frequency offset may be in terms of transmission occasions (e.g., ROs) or resource blocks (e.g., physical resource blocks). For example, the starting point may be indicated in terms of a frequency offset of ROs with regard to the first RO configured for the non-RedCap UE. In certain cases, the starting point may be indicated in terms of a frequency offset of resource blocks with regard to the lowest resource block within the ROs configured for the non-RedCap UE.

For certain aspects, the starting point may be indicated in terms of a frequency offset from a lowest frequency resource in an uplink bandwidth part, and the frequency offset may be in terms of resource blocks. In certain cases, the uplink bandwidth part may be for baseline NR UEs or narrowband UEs. That is, the starting point may be indicated in terms of a frequency offset of resource blocks with regard to the lowest resource block (e.g., PRB0) of a RedCap or a non-RedCap uplink bandwidth part. For certain cases, the bandwidth of the uplink bandwidth part may be in compliance with a narrowband capability of the UE.

In aspects, at block 702, the UE may receive the configuration in control signaling such as system information, radio resource control (RRC) signaling, downlink control information (DCI), and/or medium access control (MAC) signaling (e.g., a MAC control element (CE)). As an example, the configuration may be received in system information (e.g., RMSI) dedicated for narrowband UEs. The system information may be dedicated to UEs with a narrowband capability. That is, the network may send a RMSI for narrowband UEs and another RMSI for baseline UEs. Expressed another way, the RMSI for narrowband UEs may include the frequency domain locations for ROs and be separate from the RMSI for baseline UEs. In certain cases, the configuration may be received in a shared RMSI for narrowband and baseline UEs. In such cases, the information providing the location of the narrowband frequency resources (e.g., the starting point and size) may be provided in separate information elements in the shared RMSI. That is, the system information that carries the configuration may include parameters shared between UEs with a narrowband capability and other UEs (e.g., UEs that support eMBB and/or URLLC services).

Figure 10:
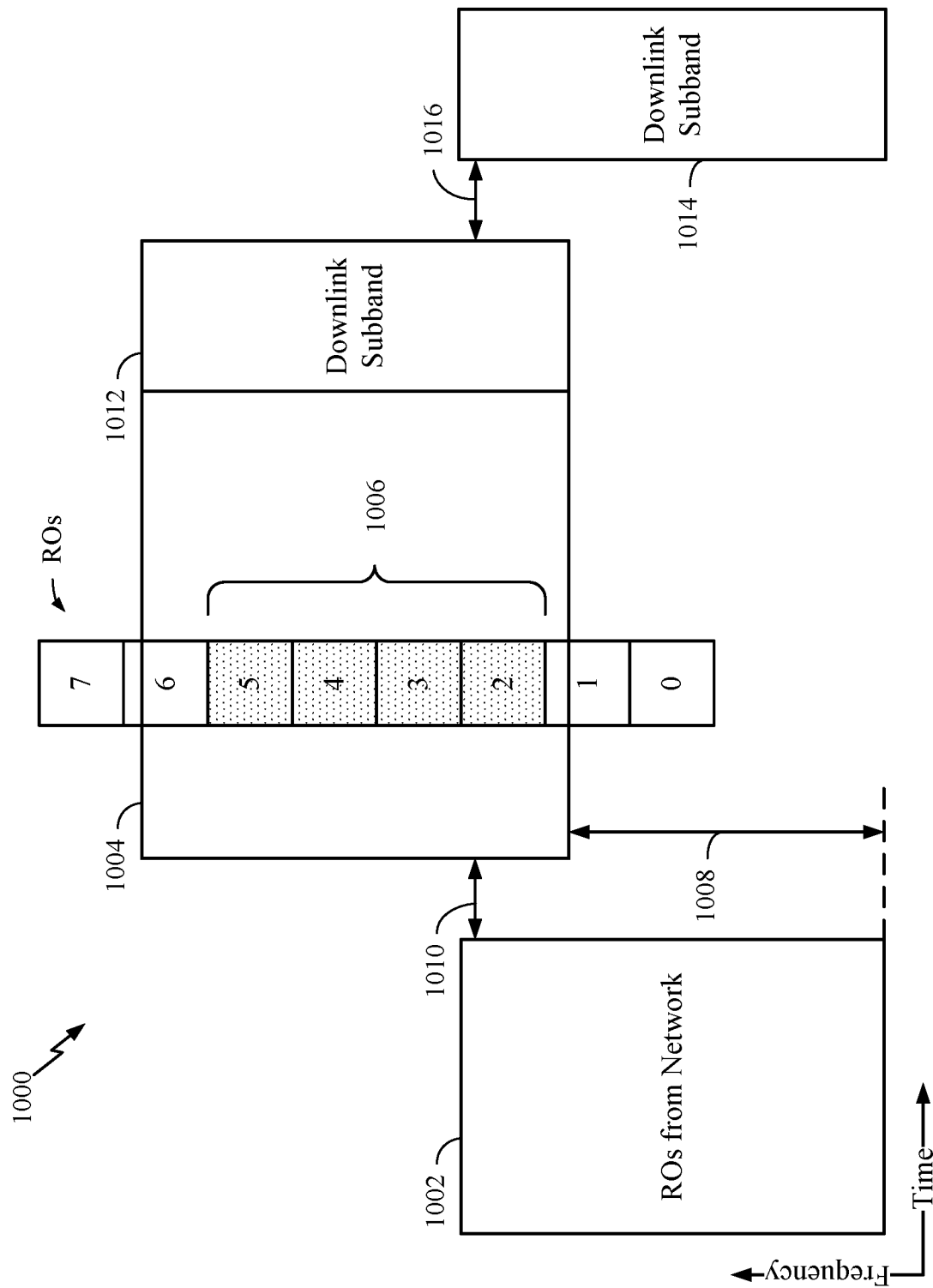
FIG. 10 is a diagram illustrating an example of retuning RACH frequency resources for a narrowband device, in accordance with certain aspects of the present disclosure.

In certain cases, the frequency resources indicated at block 702 may be outside or partially outside an uplink and/or downlink bandwidth part(s) allocated to a narrowband UE, for example, as described herein with respect to FIG. 10. If the narrowband ROs indicated in the configuration at block 702 are arranged outside the uplink and/or downlink bandwidth part(s) of the narrowband UE, the narrowband UE may retune to select ROs in the uplink and/or downlink bandwidth parts(s) allocated to the narrowband UE. With respect to the operations 700, the UE may identify that the frequency resources indicated at block 702 are at least partially outside an uplink bandwidth part and/or a downlink bandwidth part assigned to the UE. The UE may select other one or more frequency resources within the uplink bandwidth part and/or the downlink bandwidth part for the RACH procedure in response to the identification. At block 704, the UE may transmit a preamble to the network entity via the other frequency resources, and in certain cases, the UE may receive a random access response from the network entity via the other frequency resources.

The location of the ROs (e.g., the starting point and size of the ROs (e.g., the total bandwidth of the ROs)) in the narrowband UE's bandwidth part(s) may be indicated by the network (for example by a retuning offset) or derived from the ROs indicated in the configuration at block 702. For example, the UE may receive, from the network entity, an indication of a retuning offset, and the UE may select the other frequency resources based on the retuning offset. For example, the retuning offset may be in terms of a number of resource blocks, and the UE may determine the starting point of the other frequency resources with respect to the retuning offset and the lowest frequency resource location in the bandwidth part assigned to the UE. That is, the retuning offset may provide the gap between the lowest frequency resource in the bandwidth part and the lowest frequency resource for the narrowband RO(s).

In certain cases, the UE may select the other frequency resources based on the frequency resources, for example, based on the size and/or offset indicated at block 702. For example, the UE may convert the starting point and size indicated in the configuration to a specific location in the bandwidth part. The UE may use the size of the ROs (i.e., the bandwidth) indicated in the configuration at block 702 to select frequency resources that make up the same size in the narrowband bandwidth part. In certain cases, the UE may use the same proportion of the frequency offset related to the bandwidth part or ROs indicated in the configuration as the retuning offset for the determining the location of the other frequency resources. In aspects, performing the RACH procedure based at least in part on the configuration may involve the UE retuning to the ROs indicated by the retuning offset and/or derived from the configuration.

In certain aspects, the UE may retune autonomously without direction from the network. In certain cases, the UE may request to retune in response to the configuration, and the UE may retune at the direction of the network. For certain cases, the configuration received at block 702 may be considered an implicit direction to perform the retune. A retuning gap may be inserted in the timeline. That is, the UE may take a certain amount of time to retune and communicate in the ROs selected in the UE's bandwidth parts. For example, the UE may transmit the preamble after waiting a gap in time from receiving the configuration to tune to the other frequency resources.

In cases where the UE retunes the ROs, the network may indicate to the UE if a downlink RACH message (e.g., MSG2 or MSGB) will be received in the same sub-band as the retuned ROs or in the sub-band as indicated in the configuration received at block 702. In the latter case, the UE may take another retuning gap to receive downlink RACH messages from the network.

With respect to the operations 700, the UE may receive, from the network entity, an indication to use the same subband as the other frequency resources for reception of a RACH response from the network entity. For example, the UE may receive such an indication in the configuration at block 702 or in other control signaling such as system information, RRC signaling, DCI, and/or MAC signaling. At block 704, the UE may receive, from the network entity, a RACH response via the other frequency resources based on the indication. In certain cases, the UE may receive, from the network entity, an indication to use the frequency resourced indicated at block 702 for reception of a RACH response from the network entity, for example, in cases where the UE will retune to send the preamble and/or payload. At block 704, the UE may receive, from the network entity, a RACH response via the other frequency resources based on the indication, and in certain cases, after waiting a gap in time from transmitting the preamble to tune to the frequency resources.

Figure 8:
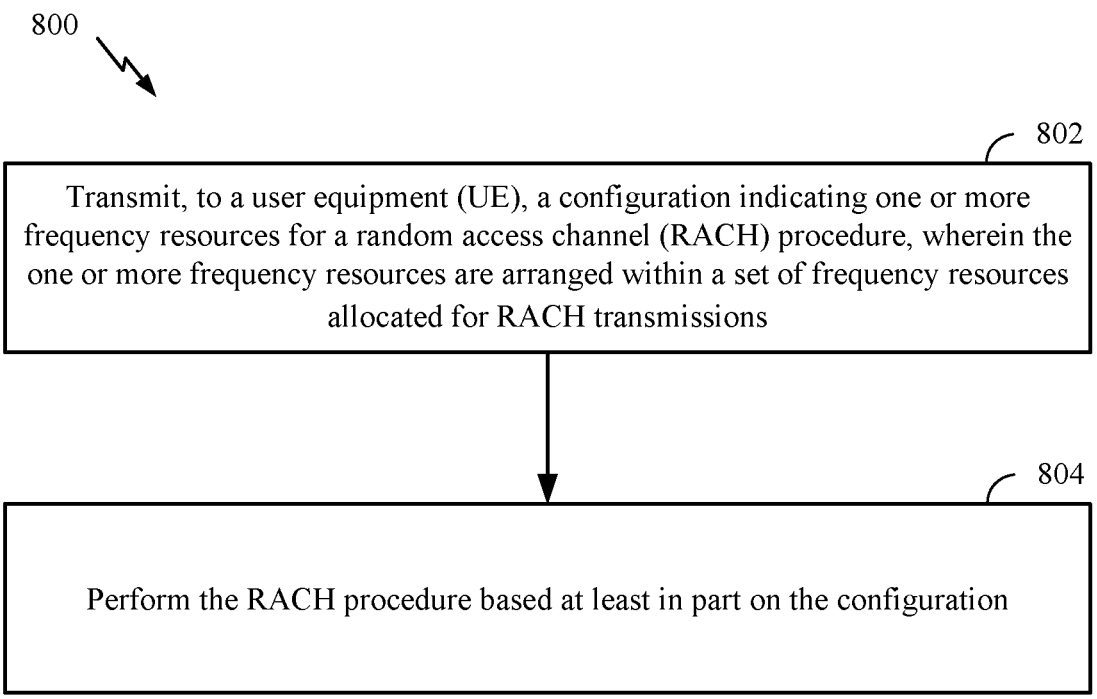
FIG. 8 is a flow diagram illustrating example operations for wireless communication by a BS, in accordance with certain aspects of the present disclosure.

FIG. 8 is a flow diagram illustrating example operations 800 for wireless communication, in accordance with certain aspects of the present disclosure. The operations 800 may be performed, for example, by a network entity (such as the BS 110a in the wireless communication network 100). The operations 800 may be complementary to the operations 700 performed by the UE. The operations 800 may be implemented as software components that are executed and run on one or more processors (e.g., controller/processor 240 of FIG. 2). Further, the transmission and reception of signals by the network entity in operations 800 may be enabled, for example, by one or more antennas (e.g., antennas 234 of FIG. 2) and/or a transceiver (e.g., the transceiver 232). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network, such as a base station, a remote radio head or antenna panel in communication with a base station, and/or network controller.

The operations 800 may begin, at block 802, where the network entity may transmit, to a UE (e.g., the UE 120), a configuration indicating one or more frequency resources for a RACH procedure, where the one or more frequency resources are arranged within a set of frequency resources allocated for RACH transmissions (e.g., ROs). For example, the network entity may transmit system information and/or RRC signaling providing the configuration for narrowband UEs, such that the frequency resources have a bandwidth in compliance with a narrowband capability of the UE. That is, the total bandwidth of the frequency resources is within the bandwidth capability of a narrowband UE, such as a RedCap UE.

At block 804, the network entity may perform the RACH procedure (e.g., any of the RACH procedures described herein with respect to FIG. 4, 5A, or 5B) based at least in part on the configuration. For example, the network entity may receive a preamble from the UE in the frequency resources indicated at block 802, and the network entity may transmit a random access response in the frequency resources indicated at block 802.

In aspects, the configuration may include a starting point for the frequency resources and a number of the frequency resources, for example, as described herein with respect to the operations 700. As an example, the starting point may be indicated in terms of a frequency offset from a lowest frequency resource in the set of frequency resources, and the frequency offset may be in terms of transmission occasions (ROs) and/or resource blocks (e.g., PRBs). In certain cases, the starting point may be indicated in terms of a frequency offset from a lowest frequency resource (PRB0) in a bandwidth part (e.g., an uplink bandwidth part and/or a downlink bandwidth part), and the frequency offset may be in terms of resource blocks. For certain aspects, the bandwidth of the bandwidth part may be in compliance with a narrowband capability of the UE (e.g., a RedCap UE) or a baseline UE (e.g., a UE that supports eMBB and/or URLLC services).

In aspects, at block 802, the network entity may transmit the configuration in control signaling such as system information (e.g., RMSI, SIB 1, and/or other system information blocks), RRC signaling, DCI, and/or MAC signaling (e.g., a MAC CE). For certain aspects, the system information that carries the configuration may be dedicated to UEs with a narrowband capability. That is, the parameters included in the system information (such as the frequency resources for the RACH) may be dedicated to UEs with a narrowband capability. In certain cases, the system information may include parameters shared between UEs with a narrowband capability and other UEs (e.g., UEs that support eMBB and/or URLLC services), for example, as described herein with respect to the operations 700.

In certain cases, the frequency resources indicated at block 802 may be outside or partially outside an uplink and/or downlink bandwidth part(s) allocated to a narrowband UE, for example, as described herein with respect to FIG. 10. In such cases, the network entity may allow the UE to retune to a subband within the narrowband bandwidth part(s) allocated to the UE, and the network entity may communicate with the UE in that retuned subband. For example, the network entity may identify that the frequency resources are at least partially outside a bandwidth part assigned to the UE. The network entity may select other one or more frequency resources for the RACH procedure within the bandwidth part in response to the identification. At block 804, the network entity may receive a preamble from the UE via the other frequency resources.

In certain aspects, the network entity may provide the UE with a retuning offset, as described herein with respect to the operations 700. For example, the network entity may transmit, to the UE, an indication of a retuning offset, and the network entity may select the other frequency resources based on the retuning offset. In certain cases, the network entity may derive the location of the other frequency resources based on the configuration sent at block 802. That is, the network entity may select the other frequency resources based on the frequency resources indicated at block 802, for example, as described herein with respect to the operations 700.

For certain aspects, the network entity may configure the UE to retune autonomously without direction from the network to initiate the retuning. In certain cases, the network entity may receive a request from the UE to retune, and the network entity may respond indicating to the UE whether to perform the retune or update its bandwidth part(s) to use the frequency resources indicated in the configuration at block 802. A retuning gap in time may be used to allow enough time for the UE to retune to the other frequency resources. At block 804, the network entity may receive the preamble after waiting a gap in time from transmitting the configuration to tune to the other frequency resources.

In aspects, the network entity may indicate, to the UE, whether to use the same subband for downlink RACH messages or to retune to the frequency resources indicated at block 802. For example, the network entity may transmit, to the UE, an indication to use the same sub-band as the other frequency resources for reception of a RACH response from the network entity. At block 804, the network entity may transmit, to the UE, a RACH response via the other frequency resources based on the indication. As an example, the network entity may transmit, to the UE, an indication to use the frequency resources indicated at block 802 for reception of a RACH response from the network entity, and at block 804, the network entity may transmit, to the UE, a RACH response via the other one or more frequency resources based on the indication. The network entity may wait for a retuning gap to allow enough time for the UE to retune to the frequency resources. For example, the network entity may transmit the RACH response after waiting a gap in time from receiving the preamble to allow the UE to tune to the one or more frequency resources.

FIG. 9 is a diagram illustrating an example arrangement of RACH frequency resources 902, in accordance with certain aspects of the present disclosure. As shown, the RACH frequency resources 902 may include eight RACH occasions (RO 0 through RO 7), and within the RACH frequency resources 902, a subset of ROs 904 may be allocated to narrowband UEs. In this example, the subset of ROs 904 for narrowband UEs may include RO 2 through RO 5. The combined bandwidth of the ROs 904 may be in compliance with the bandwidth capability of narrowband UEs. For example, the ROs 904 may occupy a subband in a bandwidth part 906 allocated to narrowband UEs.

As described herein with respect to the operations 700, the size and location of the ROs 904 may be indicated to the UE in various manners. In certain cases, the size of the ROs 904 may be indicated in terms of the number of ROs and/or resource blocks that make up the ROs 904. In this example, the UE may receive an indication that there are four ROs for the narrowband ROs 904. A starting point 908 of the ROs 904 may be indicated in terms of a frequency offset (910*a*, 910*b*, 910*c*) and a corresponding reference point (912*a*, 912*b*, 912*c*), where the starting point 908 may be the lowest frequency resource in the ROs 904. The frequency offset 910*a*, 910*b*, 910*c* may be arranged between the reference point 912*a*, 912*b*, 912*c* and the starting point 908. For example, the reference point 912*a* may be the lowest frequency resource (e.g., PRB0) of a bandwidth part allocated to baseline UEs (e.g., UEs that support the full bandwidth capabilities of NR communications such as eMBB and/or URLLC). The reference point 912*b* may be the lowest frequency resource of the RACH frequency resources 902 allocated to baseline UEs. In such a case, the frequency offset 910*b* may be indicated in terms of the number of ROs between the reference point 912*b* and the starting point 908. The reference point 912*c* may be the lowest frequency resource of the narrowband bandwidth part 906. Those of skill in the art will understand that the offsets and/or reference points illustrated in FIG. 9 are exemplary only. Other offsets and/or reference points may be used in addition to or instead of those illustrated.

FIG. 10 is a diagram illustrating an example of retuning RACH frequency resources for a narrowband UE, in accordance with certain aspects of the present disclosure. In this example, the UE may receive a configuration for narrowband ROs 1002, which may be arranged at least partially outside of the narrowband bandwidth part 1004. The UE may retune the narrowband ROs to be within the narrowband bandwidth part 1004. For example, the UE may select other narrowband ROs 1006 within the narrowband bandwidth part 1004. The UE may use a retuning offset 1008 to identify the location of the other narrowband ROs 1006, where the retuning offset 1008 may provide the frequency offset between the lowest frequency resource of the ROs 1002 and the lowest frequency resource of the narrowband bandwidth part 1004. In aspects, the UE may take a certain retuning gap 1010 in time to select and communicate on the other ROs 1006. In certain cases, the UE may continue to receive RACH messages within the same subband 1012 of the other ROs. In certain cases, the UE may retune to a different subband 1014 for reception of the RACH messages, and the UE may take another retuning gap 1016 to tune to the different subband 1014.

Figure 11A:
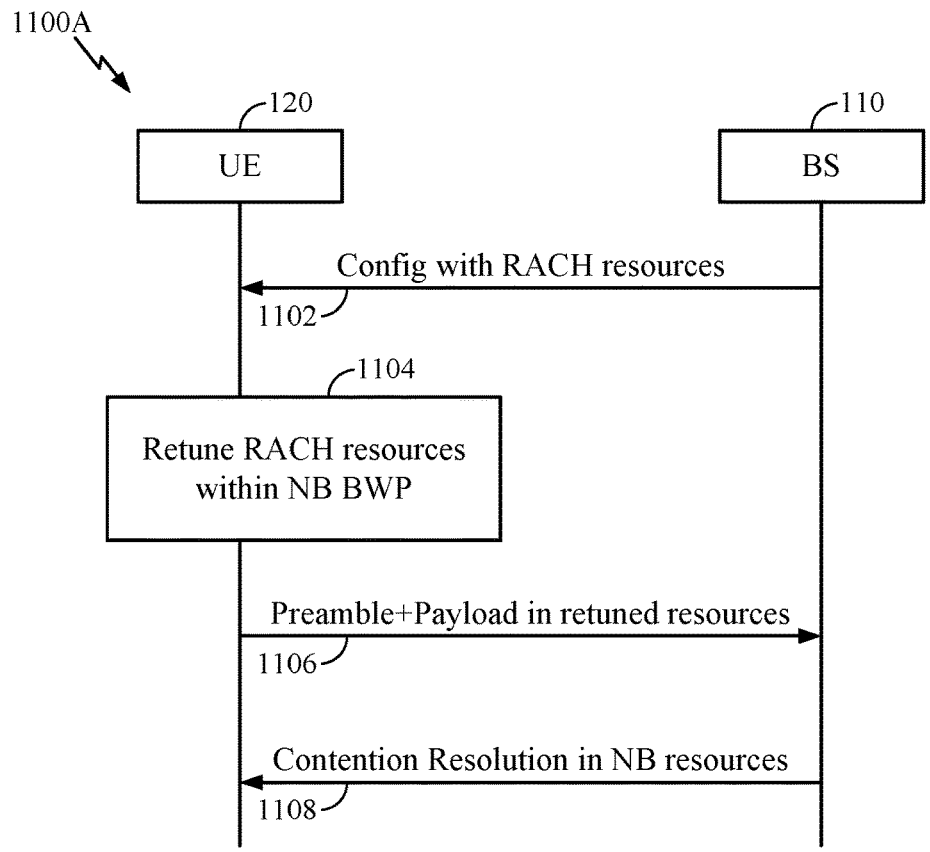
FIG. 11A is a signaling flow diagram illustrating example signaling for configuring narrowband RACH occasions (ROs) and retuning the ROs, in accordance with aspects of the present disclosure.

FIG. 11A is a signaling flow diagram illustrating example signaling 1100A of retuning RACH frequency resources for a narrowband device, in accordance with certain aspects of the present disclosure. At 1102, the UE 120 may receive a configuration with frequency resources for RACH. The configuration may provide a set of frequency resources in compliance with a narrowband capability. In certain cases, the configuration may not provide a separate set of frequency resources for narrowband communications. That is, the frequency resources indicated at 1102 may not be in compliance with a narrowband capability. At 1104, the UE 120 may identify that the frequency resources are outside the bandwidth part assigned to the UE 120, and the UE 120 may retune the narrowband frequency resources to be within the bandwidth part of the UE 120, for example, as described herein with respect to FIG. 10. At 1106, the UE 120 may transmit a message (e.g., MSGA) including a random access preamble and a payload in the retuned frequency resources. At 1108, the UE 120 may receive a contention resolution message from the BS 110 in the frequency resources indicated at 1102. In certain cases, the configuration at 1102 may indicate to the UE 120 to use the frequency resources indicated at 1102 for reception of a random access response following a retune.

Figure 11B:
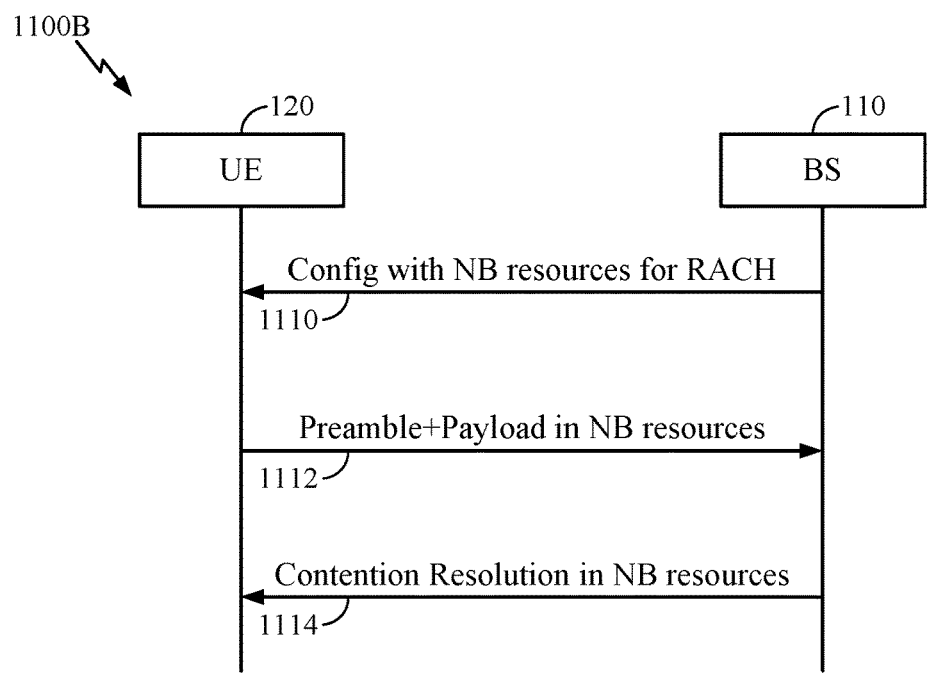
FIG. 11B is a signaling flow diagram illustrating example signaling for configuring narrowband ROs, in accordance with aspects of the present disclosure.

FIG. 11B is a signaling flow diagram illustrating example signaling 1100B of configuring RACH frequency domain resources for a narrowband device, in accordance with certain aspects of the present disclosure. At 1110, the UE 120 may receive a configuration indicating narrowband frequency resources for RACH, and the narrowband frequency resources may be arranged within the bandwidth part allocated to the UE 120 and be in compliance with the narrowband capability of the UE 120. As an example, the narrowband frequency resources may be indicated using one of the techniques described herein with respect to FIG. 9. At 1112, the UE 120 may transmit a message including a random access preamble and a payload using the narrowband frequency resources indicated at 1110. At 1114, the BS 110 may transmit a contention resolution message using the narrowband frequency resources indicated at 1110.

It will be appreciated that the narrowband configuration for RACH communications described herein may provide various advantages. For example, the narrowband RACH configuration may enable desirable latencies, reliability, and/or spectral efficiency for narrowband UEs, such as a RedCap UE, in a RACH procedure.

Figure 12:
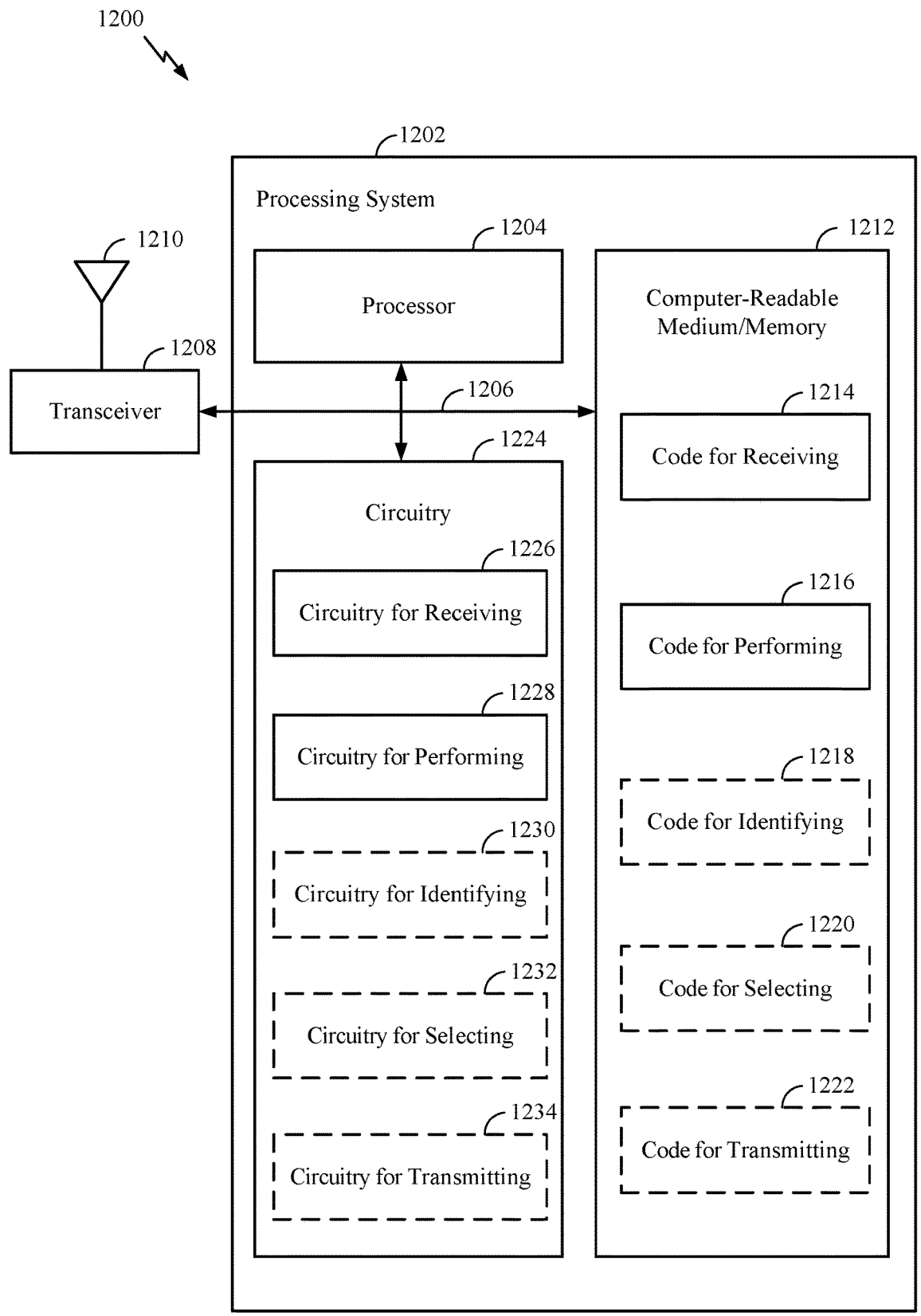
FIG. 12 illustrates a communications device that may include various components configured to perform operations for the techniques disclosed herein in accordance with aspects of the present disclosure.

FIG. 12 illustrates a communications device 1200 (e.g., a UE) that may include various components (e.g., corresponding to means-plus-function components) configured to perform operations for the techniques disclosed herein, such as the operations illustrated in FIG. 7. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/ memory 1212 is configured to store instructions (e.g., computer-executable code) that when executed by the processor 1204, cause the processor 1204 to perform the operations illustrated in FIG. 7, or other operations for performing the various techniques discussed herein for narrowband RACH communications. In certain aspects, computer-readable medium/memory 1212 stores code for receiving 1214, code for performing 1216, code for identifying 1218, code for selecting 1220, and/or code for transmitting 1222. In certain aspects, the processing system 1202 has circuitry 1224 configured to implement the code stored in the computer-readable medium/memory 1212. In certain aspects, the circuitry 1224 is coupled to the processor 1204 and/or the computer-readable medium/memory 1212 via the bus 1206. For example, the circuitry 1224 includes circuitry for receiving 1226, circuitry for performing 1228, circuitry for identifying 1230, circuitry for selecting 1232, and/or circuitry for transmitting 1234.

Figure 13:
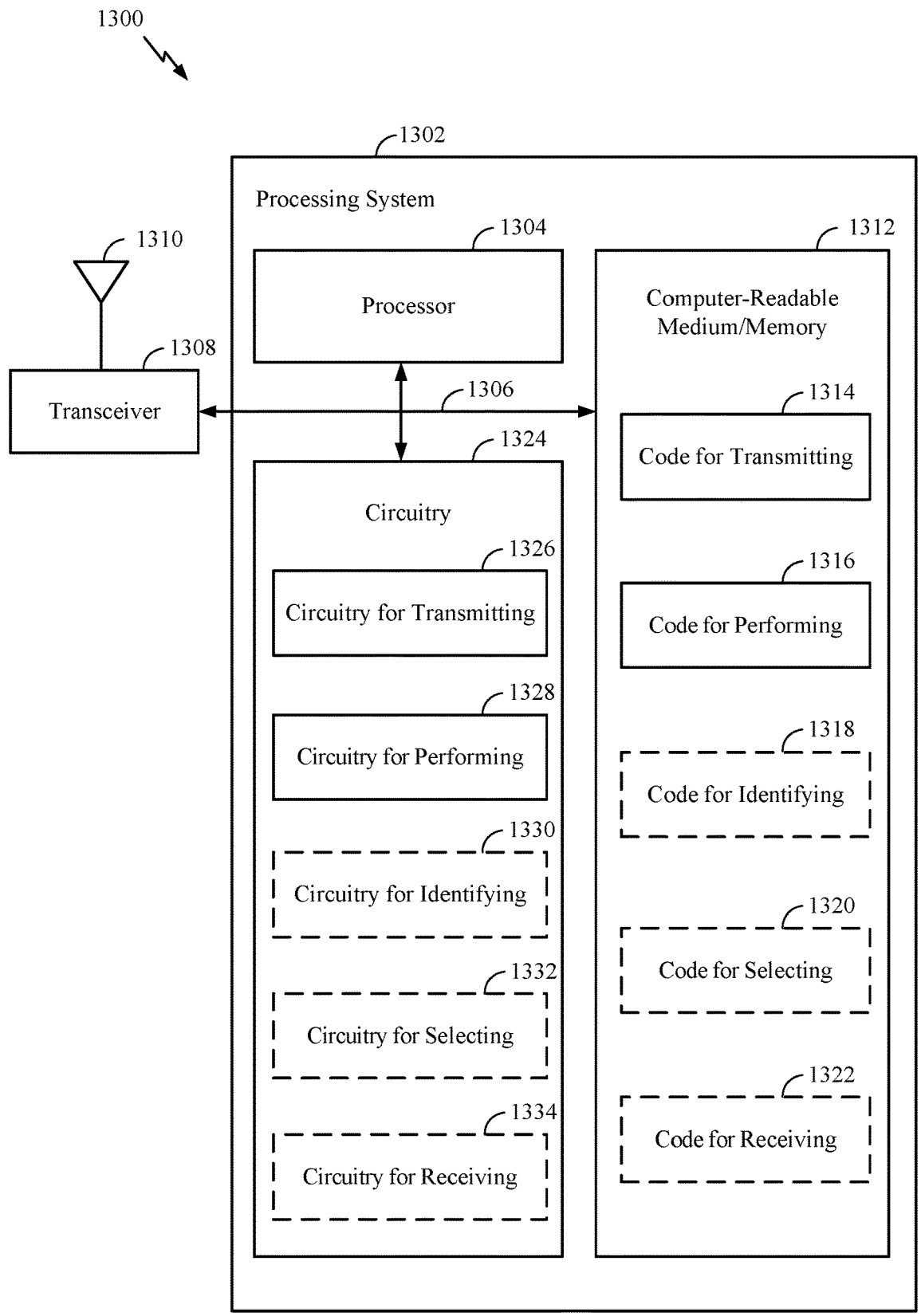
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 8. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/ memory 1312 is configured to store instructions (e.g., computer-executable code) that when executed by the processor 1304, cause the processor 1304 to perform the operations illustrated in FIG. 8, or other operations for performing the various techniques discussed herein for narrowband RACH communications. In certain aspects, computer-readable medium/memory 1312 stores code for transmitting 1314, code for performing 1316, code for identifying 1318, code for selecting 1320, and/or code for receiving 1322. In certain aspects, the processing system 1302 has circuitry 1324 configured to implement the code stored in the computer-readable medium/memory 1312. In certain aspects, the circuitry 1324 is coupled to the processor 1304 and/or the computer-readable medium/memory 1312 via the bus 1306. For example, the circuitry 1324 includes circuitry for transmitting 1326, circuitry for performing 1328, circuitry for identifying 1330, circuitry for selecting 1332, and/or circuitry for receiving 1334.

Example Aspects

In addition to the various aspects described above, specific combinations of aspects are within the scope of the disclosure, some of which are detailed below:

Aspect 1. A method of wireless communication by a user equipment, comprising: receiving, from a network entity, a configuration indicating one or more frequency resources for a random access channel (RACH) procedure, wherein the one or more frequency resources are arranged within a set of frequency resources allocated for RACH transmissions; and performing the RACH procedure based at least in part on the configuration.

Aspect 2. The method of Aspect 1, wherein the one or more frequency resources have a bandwidth in compliance with a narrowband capability of the UE.

Aspect 3. The method of Aspect 2, wherein the narrowband capability supports a bandwidth of 20 MHz for a first frequency range and a bandwidth of 100 MHz for a second frequency range.

Aspect 4. The method according any of Aspects 1-3, wherein the configuration includes a starting point for the one or more frequency resources and a number of the one or more frequency resources.

Aspect 5. The method of Aspect 4, wherein: the starting point is indicated in terms of a frequency offset from a lowest frequency resource in the set of frequency resources; and the frequency offset is in terms of transmission occasions or physical resource blocks.

Aspect 6. The method of Aspect 4, wherein: the starting point is indicated in terms of a frequency offset from a lowest frequency resource in a bandwidth part; and the frequency offset is in terms of physical resource blocks.

Aspect 7. The method of Aspect 6, wherein the bandwidth of the bandwidth part is in compliance with a narrowband capability of the UE.

Aspect 8. The method according any of Aspects 1-7, wherein receiving the configuration comprises receiving the configuration in system information.

Aspect 9. The method of Aspect 8, wherein the system information is dedicated to UEs with a narrowband capability.

Aspect 10. The method of Aspect 8, wherein the system information includes parameters shared between UEs with a narrowband capability and other UEs.

Aspect 11. The method according any of Aspects 1-10, further comprising: identifying that the one or more frequency resources are at least partially outside a bandwidth part assigned to the UE; selecting other one or more frequency resources within the bandwidth part for the RACH procedure in response to the identification; and wherein performing the RACH procedure comprises transmitting a preamble to the network entity via the other one or more frequency resources.

Aspect 12. The method of Aspect 11, further comprising: receiving, from the network entity, an indication of a retuning offset; and wherein selecting the other one or more frequency resources comprises selecting the other one or more frequency resources based on the retuning offset.

Aspect 13. The method according to any of Aspects 11 or 12, wherein selecting the other one or more frequency resources comprises selecting the other one or more frequency resources based on the one or more frequency resources.

Aspect 14. The method according any of Aspects 11-13, wherein transmitting the preamble comprises transmitting the preamble after waiting a gap in time from receiving the configuration to tune to the other one or more frequency resources.

Aspect 15. The method according any of Aspects 11-14, further comprising: receiving, from the network entity, an indication to use a same subband as the other one or more frequency resources for reception of a RACH response from the network entity; and wherein performing the RACH procedure comprises receiving, from the network entity, a RACH response via the other one or more frequency resources based on the indication.

Aspect 16. The method according any of Aspects 11-14, further comprising: receiving, from the network entity, an indication to use the one or more frequency resources for reception of a RACH response from the network entity; and wherein performing the RACH procedure comprises receiving, from the network entity, a RACH response via the other one or more frequency resources based on the indication.

Aspect 17. The method of Aspect 16, wherein receiving the RACH response comprises receiving the RACH response after waiting a gap in time from transmitting the preamble to tune to the one or more frequency resources.

Aspect 18. A method of wireless communication by a network entity, comprising: transmitting, to a user equipment (UE), a configuration indicating one or more frequency resources for a random access channel (RACH) procedure, wherein the one or more frequency resources are arranged within a set of frequency resources allocated for RACH transmissions; and performing the RACH procedure based at least in part on the configuration.

Aspect 19. The method of Aspect 18, wherein the one or more frequency resources have a bandwidth in compliance with a narrowband capability of the UE.

Aspect 20. The method of Aspect 19, wherein the narrowband capability supports a bandwidth of 20 MHz for a first frequency range and a bandwidth of 100 MHz for a second frequency range.

Aspect 21. The method according to any of Aspects 18-20, wherein the configuration includes a starting point for the one or more frequency resources and a number of the one or more frequency resources.

Aspect 22. The method of Aspect 21, wherein: the starting point is indicated in terms of a frequency offset from a lowest frequency resource in the set of frequency resources; and the frequency offset is in terms of transmission occasions or physical resource blocks.

Aspect 23. The method of Aspect 21, wherein: the starting point is indicated in terms of a frequency offset from a lowest frequency resource in a bandwidth part; and the frequency offset is in terms of physical resource blocks.

Aspect 24. The method of Aspect 23, wherein the bandwidth of the bandwidth part is in compliance with a narrowband capability of the UE.

Aspect 25. The method according to any of Aspects 18-24, wherein transmitting the configuration comprises transmitting the configuration in system information.

Aspect 26. The method of Aspect 25, wherein the system information is dedicated to UEs with a narrowband capability.

Aspect 27. The method of Aspect 25, wherein the system information includes parameters shared between UEs with a narrowband capability and other UEs.

Aspect 28. The method according to any of Aspects 18-27, further comprising: identifying that the one or more frequency resources are at least partially outside a bandwidth part assigned to the UE; selecting other one or more frequency resources within the bandwidth part for the RACH procedure in response to the identification; and wherein performing the RACH procedure comprises receiving a preamble from the UE via the other one or more frequency resources.

Aspect 29. The method of Aspect 28, further comprising: transmitting, to the UE, an indication of a retuning offset; and wherein selecting the other one or more frequency resources comprises selecting the other one or more frequency resources based on the retuning offset.

Aspect 30. The method according to any of Aspects 28 or 29, wherein selecting the other one or more frequency resources comprises selecting the other one or more frequency resources based on the one or more frequency resources.

Aspect 31. The method according to any of Aspects 28-30, wherein receiving the preamble comprises receiving the preamble after waiting a gap in time from transmitting the configuration to tune to the other one or more frequency resources.

Aspect 32. The method according to any of Aspects 28-31, further comprising: transmitting, to the UE, an indication to use a same subband as the other one or more frequency resources for reception of a RACH response from the network entity; and wherein performing the RACH procedure comprises transmitting, to the UE, a RACH response via the other one or more frequency resources based on the indication.

Aspect 33. The method according to any of Aspects 28-31, further comprising: transmitting, to the UE, an indication to use the one or more frequency resources for reception of a RACH response from the network entity; and wherein performing the RACH procedure comprises transmitting, to the UE, a RACH response via the other one or more frequency resources based on the indication.

Aspect 34. The method of Aspect 33, wherein transmitting the RACH response comprises transmitting the RACH response after waiting a gap in time from receiving the preamble to tune to the one or more frequency resources.

Aspect 35: An apparatus, comprising: a memory comprising executable instructions; one or more processors configured to execute the executable instructions and cause the apparatus to perform a method in accordance with any one of Aspects 1-34.

Aspect 36: An apparatus, comprising means for performing a method in accordance with any one of Aspects 1-34.

Aspect 37: A computer-readable medium comprising executable instructions that, when executed by one or more processors of an apparatus, cause the apparatus to perform a method in accordance with any one of Aspects 1-34.

Aspect 38: A computer program product embodied on a computer-readable storage medium comprising code for performing a method in accordance with any one of Aspects 1-34.

Aspect 39: A user equipment for wireless communication, comprising: a memory; and a processor coupled to the memory, the processor and the memory being configured to: receive, from a network entity, a configuration indicating one or more frequency resources for a random access channel (RACH) procedure, wherein the one or more frequency resources are arranged within a set of frequency resources allocated for RACH transmissions; and perform the RACH procedure based at least in part on the configuration.

Aspect 40: The user equipment of Aspect 39, wherein: the one or more frequency resources have a bandwidth in compliance with a narrowband capability of the UE; and the narrowband capability supports a bandwidth of 20 MHz for a first frequency range and a bandwidth of 100 MHz for a second frequency range.

Aspect 41: The user equipment according to any of Aspects 39 or 40, wherein the configuration includes a starting point for the one or more frequency resources and a number of the one or more frequency resources.

Aspect 42: The user equipment of Aspect 41, wherein: the starting point is indicated in terms of a frequency offset from a lowest frequency resource in the set of frequency resources; and the frequency offset is in terms of transmission occasions or physical resource blocks.

Aspect 43: The user equipment according to any of Aspects 41 or 42, wherein: the starting point is indicated in terms of a frequency offset from a lowest frequency resource in a bandwidth part; and the frequency offset is in terms of physical resource blocks.

Aspect 44: The user equipment according to any of Aspects 39-43, wherein the processor and the memory are configured to receive the configuration in system information.

Aspect 45: The user equipment according to any of Aspects 39-44, wherein the processor and the memory are configured to: identify that the one or more frequency resources are at least partially outside a bandwidth part assigned to the UE; select other one or more frequency resources within the bandwidth part for the RACH procedure in response to the identification; and transmit a preamble to the network entity via the other one or more frequency resources.

Aspect 46: The user equipment of Aspect 45, wherein: the processor and the memory are configured to receive, from the network entity, an indication of a retuning offset; and select the other one or more frequency resources based on the retuning offset.

Aspect 47: The user equipment according to any of Aspects 45 or 46, wherein the processor and the memory are configured to select the other one or more frequency resources based on the one or more frequency resources.

Aspect 48: The user equipment according to any of Aspects 45-47, wherein the processor and the memory are configured to transmit the preamble after waiting a gap in time from receiving the configuration to tune to the other one or more frequency resources.

Aspect 49: The user equipment according to any of Aspects 45-48, wherein the processor and the memory are configured to: receive, from the network entity, an indication to use a same subband as the other one or more frequency resources for reception of a RACH response from the network entity; and receive, from the network entity, a RACH response via the other one or more frequency resources based on the indication.

Aspect 50: The user equipment according to any of Aspects 45-49, wherein the processor and the memory are configured to: receive, from the network entity, an indication to use the one or more frequency resources for reception of a RACH response from the network entity; and receive, from the network entity, a RACH response via the other one or more frequency resources based on the indication.

Aspect 51: The user equipment of Aspect 50, wherein the processor and the memory are configured to receive the RACH response after waiting a gap in time from transmitting the preamble to tune to the one or more frequency resources.

Aspect 52: A network entity for wireless communication, comprising: a memory; and a processor coupled to the memory, the processor and the memory being configured to: transmit, to a user equipment (UE), a configuration indicating one or more frequency resources for a random access channel (RACH) procedure, wherein the one or more frequency resources are arranged within a set of frequency resources allocated for RACH transmissions; and perform the RACH procedure based at least in part on the configuration.

Aspect 53: The network entity of Aspect 52, wherein: the one or more frequency resources have a bandwidth in compliance with a narrowband capability of the UE; and the narrowband capability supports a bandwidth of 20 MHz for a first frequency range and a bandwidth of 100 MHz for a second frequency range.

Aspect 54: The network entity according to any of Aspects 52 or 53, wherein the configuration includes a starting point for the one or more frequency resources and a number of the one or more frequency resources.

Aspect 55: The network entity of Aspect 54, wherein: the starting point is indicated in terms of a frequency offset from a lowest frequency resource in the set of frequency resources; and the frequency offset is in terms of transmission occasions or physical resource blocks.

Aspect 56: The network entity according to any of Aspects 54 or 55, wherein: the starting point is indicated in terms of a frequency offset from a lowest frequency resource in a bandwidth part; and the frequency offset is in terms of physical resource blocks.

Aspect 57: The network entity according to any of Aspects 52-56, wherein the processor and the memory are configured to transmit the configuration in system information.

Aspect 58: The network entity according to any of Aspects 52-57, wherein the processor and the memory are configured to: identify that the one or more frequency resources are at least partially outside a bandwidth part assigned to the UE; select other one or more frequency resources within the bandwidth part for the RACH procedure in response to the identification; and receive a preamble from the UE via the other one or more frequency resources.

Aspect 59: The network entity of Aspect 58, wherein: the processor and the memory are configured to transmit, to the UE, an indication of a retuning offset; and the processor and the memory are configured to select the other one or more frequency resources based on the retuning offset.

Aspect 60: The network entity according to any of Aspects 58 or 59, wherein the processor and the memory are configured to select the other one or more frequency resources based on the one or more frequency resources.

Aspect 61: The network entity according to any of Aspects 58-60, wherein the processor and the memory are configured to receive the preamble after waiting a gap in time from transmitting the configuration to tune to the other one or more frequency resources.

Aspect 62: The network entity according to any of Aspects 58-61, wherein the processor and the memory are configured to: transmit, to the UE, an indication to use a same subband as the other one or more frequency resources for reception of a RACH response from the network entity; and transmit, to the UE, a RACH response via the other one or more frequency resources based on the indication.

Aspect 63: The network entity according to any of Aspects 58-62, wherein the processor and the memory are configured to: transmit, to the UE, an indication to use the one or more frequency resources for reception of a RACH response from the network entity; and transmit, to the UE, a RACH response via the other one or more frequency resources based on the indication.

Aspect 64: The network entity of Aspect 63, wherein the processor and the memory are configured to transmit the RACH response after waiting a gap in time from receiving the preamble to tune to the one or more frequency resources.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication by a user equipment (UE), comprising:
one or more processors individually or collectively configured to execute instructions stored on one or more memories and to cause the UE to:
receive, from a network entity, a narrowband random access channel (RACH) configuration indicating one or more narrowband frequency resources, for a RACH procedure, that are arranged within a set of frequency resources allocated for RACH transmissions for non-narrowband UEs, wherein:
the one or more narrowband frequency resources have a bandwidth that is in compliance with a capability of the user equipment;
the capability supports a first carrier bandwidth for a first frequency range and a second carrier bandwidth for a second frequency range;
the narrowband RACH configuration includes:
a number of the one or more narrowband frequency resources; and
an offset between a starting point of the one or more narrowband frequency resources and a lowest frequency of the set of frequency resources allocated for RACH transmissions for the non-narrowband UEs; and
perform the RACH procedure based at least in part on the narrowband RACH configuration.

2. The apparatus of claim 1, wherein:
the capability includes a narrowband capability; and
the narrowband capability supports the first carrier bandwidth of 20 MHz for the first frequency range and the second carrier bandwidth of 100 MHz for the second frequency range.

3. The apparatus of claim 1, wherein the offset is indicated in terms of transmission occasions or physical resource blocks.

4. The apparatus of claim 1, wherein the one or more processors are further configured to cause the UE to receive the narrowband RACH configuration in system information.

5. The apparatus of claim 1, wherein the one or more processors are further configured to cause the UE to:
identify that the one or more narrowband frequency resources are at least partially outside a bandwidth part assigned to the user equipment;
select other one or more narrowband frequency resources within the bandwidth part for the RACH procedure in response to the identification; and
transmit a preamble to the network entity via the other one or more narrowband frequency resources.

6. The apparatus of claim 5, wherein the one or more processors are further configured to cause the UE to:
receive, from the network entity, an indication of a retuning offset; and
select the other one or more narrowband frequency resources based on the retuning offset.

7. The apparatus of claim 5, wherein the one or more processors are further configured to cause the UE to select the other one or more narrowband frequency resources based on the one or more narrowband frequency resources.

8. The apparatus of claim 5, wherein the one or more processors are further configured to cause the UE to transmit the preamble after waiting a gap in time from receiving the narrowband RACH configuration to tune to the other one or more narrowband frequency resources.

9. The apparatus of claim 5, wherein the one or more processors are further configured to cause the UE to:
receive, from the network entity, an indication to use a same subband as the other one or more narrowband frequency resources for reception of a RACH response from the network entity; and
receive, from the network entity, a RACH response via the other one or more narrowband frequency resources based on the indication.

10. The apparatus of claim 5, wherein the one or more processors are further configured to cause the UE to:
receive, from the network entity, an indication to use the one or more narrowband frequency resources for reception of a RACH response from the network entity; and
receive, from the network entity, a RACH response via the other one or more narrowband frequency resources based on the indication.

11. The apparatus of claim 10, wherein the one or more processors are further configured to cause the UE to receive the RACH response after waiting a gap in time from transmitting the preamble to tune to the one or more narrowband frequency resources.

12. An apparatus for wireless communication by a network entity, comprising:
one or more processors individually or collectively configured to execute instructions stored on one or more memories and to cause the network entity to:
transmit, to a user equipment (UE), a narrowband random access channel (RACH) configuration indicating one or more narrowband frequency resources, for a RACH procedure, that are arranged within a set of frequency resources allocated for RACH transmissions, wherein:
the one or more narrowband frequency resources have a bandwidth that is in compliance with a capability of the user equipment;
the capability supports a first carrier bandwidth for a first frequency range and a second carrier bandwidth for a second frequency range;
the narrowband RACH configuration includes:
a number of the one or more narrowband frequency resources; and
an offset between a starting point of the one or more narrowband frequency resources and a lowest frequency of the set of frequency resources allocated for RACH transmissions for non-narrowband UEs; and
perform the RACH procedure based at least in part on the narrowband RACH configuration.

13. The apparatus of claim 12, wherein:
the capability of the UE includes a narrowband capability; and
the narrowband capability supports the first carrier bandwidth of 20 MHz for the first frequency range and the second carrier bandwidth of 100 MHz for the second frequency range.

14. The apparatus of claim 12, wherein the offset is indicated in terms of transmission occasions or physical resource blocks.

15. The apparatus of claim 12, wherein the one or more processors are further configured to cause the network entity to transmit the narrowband RACH configuration in system information.

16. The apparatus of claim 12, wherein the one or more processors are further configured to cause the network entity to:
identify that the one or more narrowband frequency resources are at least partially outside a bandwidth part assigned to the UE;
select other one or more narrowband frequency resources within the bandwidth part for the RACH procedure in response to the identification; and
receive a preamble from the UE via the other one or more narrowband frequency resources.

17. The apparatus of claim 16, wherein the one or more processors are further configured to cause the network entity to:
transmit, to the UE, an indication of a retuning offset; and
select the other one or more narrowband frequency resources based on the retuning offset.

18. The apparatus of claim 16, wherein the one or more processors are further configured to cause the network entity to select the other one or more narrowband frequency resources based on the one or more narrowband frequency resources.

19. The apparatus of claim 16, wherein the one or more processors are further configured to cause the network entity to receive the preamble after waiting a gap in time from transmitting the narrowband RACH configuration to tune to the other one or more narrowband frequency resources.

20. The apparatus of claim 16, wherein the one or more processors are further configured to cause the network entity to:
transmit, to the UE, an indication to use a same subband as the other one or more narrowband frequency resources for reception of a RACH response from the network entity; and
transmit, to the UE, a RACH response via the other one or more narrowband frequency resources based on the indication.

21. The apparatus of claim 16, wherein the one or more processors are further configured to cause the network entity to:
transmit, to the UE, an indication to use the one or more narrowband frequency resources for reception of a RACH response from the network entity; and
transmit, to the UE, a RACH response via the other one or more narrowband frequency resources based on the indication.

22. The apparatus of claim 21, wherein the one or more processors are further configured to cause the network entity to transmit the RACH response after waiting a gap in time from receiving the preamble to tune to the one or more narrowband frequency resources.

23. A method of wireless communication by a user equipment, comprising:
receiving, from a network entity, a narrowband random access channel (RACH) configuration indicating one or more narrowband frequency resources, for a RACH procedure, that are arranged within a set of frequency resources allocated for RACH transmissions for non-narrowband UEs, wherein:
the one or more narrowband frequency resources have a bandwidth that is in compliance with a capability of the user equipment;
the capability supports a first carrier bandwidth for a first frequency range and a second carrier bandwidth for a second frequency range;
the narrowband RACH configuration includes:
a number of the one or more narrowband frequency resources; and
an offset between a starting point of the one or more narrowband frequency resources and a lowest frequency of the set of frequency resources allocated for RACH transmissions for the non-narrowband UEs; and
performing the RACH procedure based at least in part on the narrowband RACH configuration.

24. A method of wireless communication by a network entity, comprising:
transmitting, to a user equipment (UE), a narrowband random access channel (RACH) configuration indicating one or more narrowband frequency resources, for a RACH procedure, that are arranged within a set of frequency resources allocated for RACH transmissions, wherein:
the one or more narrowband frequency resources have a bandwidth that is in compliance with a capability of the user equipment;
the capability supports a first carrier bandwidth for a first frequency range and a second carrier bandwidth for a second frequency range;
the narrowband RACH configuration includes:
a number of the one or more narrowband frequency resources; and an offset between a starting point of the one or more narrowband frequency resources and a lowest frequency of the set of frequency resources allocated for RACH transmissions for non-narrowband UEs; and performing the RACH procedure based at least in part on the narrowband RACH configuration.

\* \* \* \* \*